(12) United States Patent
Bill

(10) Patent No.: US 12,509,248 B2
(45) Date of Patent: Dec. 30, 2025

(54) AIRCRAFT TIRE MONITORING SYSTEM

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 189 days.

(21) Appl. No.: 18/319,327

(22) Filed: May 17, 2023

(65) Prior Publication Data

US 2023/0373652 A1    Nov. 23, 2023

(30) Foreign Application Priority Data

May 18, 2022   (GB) ...................................... 2207284

(51) Int. Cl.
*B64F 5/40*     (2017.01)
*B64D 45/00*    (2006.01)
(Continued)

(52) U.S. Cl.
CPC .................. *B64F 5/40* (2017.01); *B64F 5/60* (2017.01); *G06Q 10/0631* (2013.01);
(Continued)

(58) Field of Classification Search
CPC ......... B64F 5/40; B64F 5/60; G06Q 10/0631; G06Q 10/06315; G06Q 10/20;
(Continued)

(56) References Cited

U.S. PATENT DOCUMENTS

| | | | |
|---|---|---|---|
| 8,599,044 B2 | 12/2013 | Maggiore et al. | |
| 8,989,951 B1 * | 3/2015 | Coop | .................. G01C 23/005 |
| | | | 701/31.4 |

(Continued)

FOREIGN PATENT DOCUMENTS

| | | | | |
|---|---|---|---|---|
| GB | 2600457 | | 5/2022 | |
| JP | 2021047683 A | * | 3/2021 | ............. G07C 5/006 |
| JP | 2021068104 | | 4/2021 | |

OTHER PUBLICATIONS

Search Report for GB2207284.7 dated Oct. 27, 2022, 5 pages.

*Primary Examiner* — Justin R. Blaufeld
(74) *Attorney, Agent, or Firm* — Nixon & Vanderhye P.C.

(57) ABSTRACT

An aircraft tire monitoring system including a processor, and a data carrier having machine readable instructions that, when executed, cause the processor to, based on a plurality of sets of values indicative of tire parameters of aircraft tires, each set of values corresponding to an aircraft comprising a plurality of the aircraft tires, perform operations including determining a remedial action associated with each set of values. The operations include determining a priority associated with the determined remedial actions, and generating, based on the determined remedial actions, a list of aircraft ranked based on the determined priority of remedial action. The operations include causing a display device to display the list of aircraft, such that aircraft with a relatively higher priority remedial action are shown higher up the list on the display than aircraft with a relatively lower priority remedial action.

21 Claims, 12 Drawing Sheets

(51) Int. Cl.
  *B64F 5/60* (2017.01)
  *G06Q 10/0631* (2023.01)
  *G06Q 10/20* (2023.01)
  *G07C 5/00* (2006.01)
  *G07C 5/08* (2006.01)
  *G07C 5/12* (2006.01)

(52) U.S. Cl.
  CPC ....... *G06Q 10/06315* (2013.01); *G06Q 10/20* (2013.01); *G07C 5/006* (2013.01); *G07C 5/008* (2013.01); *G07C 5/0816* (2013.01); *G07C 5/12* (2013.01); *B60C 2200/02* (2013.01); *B64D 45/00* (2013.01); *B64D 2045/0085* (2013.01)

(58) Field of Classification Search
  CPC ...... G07C 5/006; G07C 5/008; G07C 5/0816; G07C 5/12; B60C 2200/02; B64D 45/00; B64D 2045/0085
  See application file for complete search history.

(56) References Cited

U.S. PATENT DOCUMENTS

| | | | |
|---|---|---|---|
| 10,809,742 B2 * | 10/2020 | Fontaine | G07C 5/008 |
| 2003/0058089 A1 * | 3/2003 | Ruehr | B60C 23/0408 |
| | | | 340/442 |
| 2007/0112608 A1 | 5/2007 | Avery et al. | |
| 2012/0191495 A1 * | 7/2012 | McIntosh | G06Q 30/00 |
| | | | 705/7.11 |
| 2012/0235807 A1 | 9/2012 | Rysenga et al. | |
| 2015/0286979 A1 | 10/2015 | Ming et al. | |
| 2016/0093119 A1 * | 3/2016 | Ahn | G07C 5/006 |
| | | | 701/29.3 |
| 2016/0303927 A1 | 10/2016 | Keller et al. | |
| 2020/0009920 A1 | 1/2020 | Oki et al. | |
| 2020/0156423 A1 * | 5/2020 | Hong | B60C 23/002 |
| 2022/0088979 A1 | 3/2022 | Bill | |
| 2022/0139119 A1 | 5/2022 | Bill | |
| 2022/0343695 A1 * | 10/2022 | Toda | B64F 5/60 |
| 2022/0357820 A1 * | 11/2022 | Breier | G06F 3/04842 |
| 2024/0203168 A1 * | 6/2024 | Starkey | G08G 1/096725 |

* cited by examiner

AIRCRAFT TIRE MONITORING SYSTEM

RELATED APPLICATION

This application incorporates by reference and claims priority to United Kingdom patent application GB 2207284.7, filed May 18, 2022.

TECHNICAL FIELD

The present invention relates to an aircraft tire monitoring system.

BACKGROUND

Checking tire pressure is an important part of the maintenance of a vehicle. Tire pressures should be maintained at predetermined pressures to ensure that a tire performs as intended by the manufacturer.

SUMMARY

A first aspect of the present invention provides an aircraft tire monitoring system comprising: a processor; and a data carrier comprising machine readable instructions that, when executed, cause the processor to perform operations based on a plurality of sets of values indicative of tire parameters of aircraft tires, each set of values corresponding to an aircraft comprising a plurality of the aircraft tires, the operations comprising: determining a remedial action associated with each set of values; determining a priority associated with the determined remedial actions; generating, based on the determined remedial actions, a list of aircraft, the list of aircraft ranked based on the determined priority of remedial action; and causing a display device to display the list of aircraft, such that aircraft with a relatively higher priority remedial action are shown higher up the list on the display than aircraft with a relatively lower priority remedial action.

By displaying the list of aircraft such that aircraft with a relatively higher priority remedial action are shown higher up the list on the display than aircraft with a relatively lower priority remedial action, those aircraft for which higher priority remedial actions are required may be more easily identified, which may facilitate ongoing maintenance procedures for the identified aircraft.

Optionally, the instructions, when executed, cause the processor to perform actions comprising causing the display device to display, for each aircraft in the list, the corresponding set of values.

Optionally, the tire parameters comprise tire pressures of associated aircraft tires, and the instructions, when executed, cause the processor to perform operations comprising causing the display device to display, for each aircraft in the list, an associated reference pressure for the corresponding aircraft tires.

Optionally, the instructions, when executed, cause the processor to perform actions comprising causing the display device to display, based on the determined priority of the remedial action, a visual indicium for each remedial action, the visual indicium configured to take one of at least a first state and a second state based on the determined priority.

Optionally the visual indicium comprises a binary visual indicium configured to take one of the first state and the second state based on the determined priority.

Optionally, the instructions, when executed, cause the processor to perform actions comprising causing the display device to display, for each aircraft in the list and associated aircraft tires, a status message based on the determined remedial actions.

Optionally, the instructions, when executed, cause the processor to perform actions comprising determining, based on the plurality of sets of values, a further remedial action for each of the aircraft tires and/or tire monitoring devices associated with each of the aircraft tires.

Optionally, the instructions, when executed, cause the processor to perform actions comprising determining, based on a status of the tire monitoring devices, corresponding further remedial actions.

Optionally the instructions, when executed, cause the processor to perform actions comprising: determining a further priority associated with each of the determined further remedial actions; and causing the display device to display, based on the determined further priorities, a further visual indicium for each aircraft tire, the further visual indicium configured to take one of at least a first state and a second state depending on the determined further priority.

Optionally the further visual indicium comprises a further binary visual indicium configured to take one of the first state and the second state.

Optionally, the determined further remedial actions comprise one or more of checking the tire monitoring device, and replacing the tire monitoring device.

Optionally, the instructions, when executed, cause the processor to perform operations comprising: generating, based on the determined further remedial actions, the list of aircraft; and causing the display device to display the list of aircraft, such that at least one of: aircraft with a relatively higher priority remedial action are shown higher up the list on the display than aircraft with a relatively lower priority remedial action, and aircraft with a higher number of determined further remedial actions are shown higher up the list on the display than aircraft with a lower number of determined further remedial actions.

Optionally, the instructions, when executed, cause the processor to perform operations comprising: generating, based on a type of the determined further remedial actions, the list of aircraft, each type of determined further remedial action having an associated priority; and causing the display device to display the list of aircraft, such that at least one of: aircraft with a relatively higher priority remedial action are shown higher up the list on the display than aircraft with a relatively lower priority remedial action, aircraft with a higher number of determined further remedial actions are shown higher up the list on the display than aircraft with a lower number of determined further remedial actions, and aircraft with a greater number of relatively higher priority determined further remedial actions are shown higher up the list on the display than aircraft with a lower number of relatively lower priority determined further remedial actions.

Optionally, the instructions, when executed, cause the processor to perform actions comprising: causing the display device to display the list such that each entry of the list is expandable to display further detail associated with the corresponding set of values, the further detail comprising one or more of a visual gauge indicator associated with the corresponding tire parameter, a location associated with the corresponding tire parameter, a tire parameter profile based on historical tire parameter readings for a given tire, and a message log comprising messages associated with status messages for the associated aircraft tires.

Optionally, the instructions, when executed, cause the processor to perform actions comprising: causing the display device to display the list of aircraft on a first display pane; causing the display device to display, for each entry in the list of aircraft, a link to a respective second display pane; and causing the display device to display, on each respective second display pane, further detail associated with the corresponding set of values, the further detail comprising one or more of a visual gauge indicator associated with the corresponding tire parameter, a location associated with the corresponding tire parameter, a tire parameter profile based on historical tire parameter readings for a given tire, and a message log comprising messages associated with status messages for the associated aircraft tires.

Optionally, the instructions, when executed, cause the processor to perform actions comprising causing the display device to display, based on status messages for associated aircraft tires, an expandable message log comprising messages associated with status messages for the associated aircraft tires.

Optionally, the messages comprise determined further remedial actions.

Optionally, the remedial action comprises reinflation of one or more tires associated with the aircraft, and the priority of the reinflation is determined based on a time to reinflation.

Optionally, the system comprises a memory configured to store the plurality of sets of values, and the instructions, when executed, cause the processor to perform operations comprising obtaining the plurality of sets of values from the memory to determine the remedial actions.

A second aspect of the present invention provides a computer-implemented method comprising: obtaining a plurality of sets of values indicative of tire parameters of aircraft tires, each set of values corresponding to an aircraft comprising a plurality of the aircraft tires; determining a remedial action associated with each set of values; determining a priority associated with the determined remedial actions; generating, based on the determined remedial actions, a list of aircraft, the list of aircraft ranked based on the determined priority of remedial action; and displaying the list of aircraft, on a display device, such that aircraft with a relatively higher priority remedial action are shown higher up the list on the display than aircraft with a relatively lower priority remedial action.

Optionally, the method comprises displaying, on the display device and for each aircraft in the list, the corresponding set of values.

Optionally, the tire parameters comprise tire pressures of associated aircraft tires, and the method comprises displaying, on the display device and for each aircraft in the list, an associated reference pressure for the corresponding aircraft tires.

Optionally, the method comprises: displaying, on the display device and for each aircraft in the list and associated aircraft tires, a status message based on the determined further remedial actions.

Optionally, the method comprises: determining, based on a status of tire monitoring devices associated with the plurality of aircraft tires, corresponding further remedial actions; determining a further priority associated with each of the determined further remedial actions; generating, based on the determined further remedial actions, the list of aircraft; and displaying, on the display device, the list of aircraft, such that at least one of aircraft with a relatively higher priority remedial action are shown higher up the list on the display than aircraft with a relatively lower priority remedial action, and aircraft with a higher number of determined further remedial actions are shown higher up the list on the display than aircraft with a lower number of determined further remedial actions.

Optional features of aspects of the present invention may be equally applied to other aspects of the invention, where appropriate.

BRIEF DESCRIPTION OF THE DRAWINGS

Embodiments of the invention will now be described, by way of example only, with reference to the accompanying drawings, in which.

DETAILED DESCRIPTION

Figure 1:
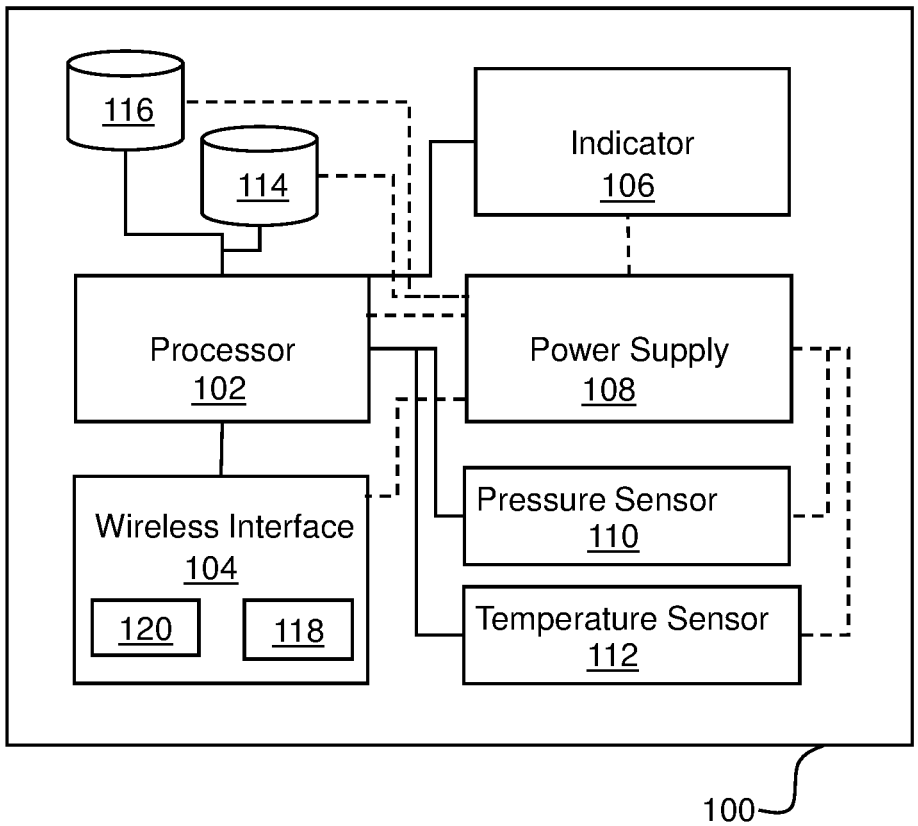
FIG. 1 shows a schematic view of an aircraft tire monitoring device.

An aircraft tire monitoring device 100 in accordance with the present invention is illustrated schematically in FIG. 1, in the form of a tire pressure monitoring device. The tire monitoring device 100 is configured for mounting on a wheel, for example by a mechanical connection to an opening on the wheel providing access to the tire. The tire monitoring device 100 includes a processor 102, a wireless communication interface 104, an indicator 106, a power supply 108, a pressure sensor 110, a temperature sensor 112, a first storage 114 and a second storage 116.

Processor 102 may be any suitable processing device including a microprocessor with one or more processing cores. In use, processor 102 coordinates and controls the other components and may be operative to read and/or write computer program instructions and data from/to the storage 114, 116. The processor 102 may be optimized for low power operation or have at least one processing core optimized for low power operation in some examples.

Wireless communication interface 104 is connected to the processor 102 and is used to both transmit and received data from the other devices of the tire pressure sensor system. In this example, the wireless communication interface 104 includes two transceivers, 118, 120 which both use different wireless technology. A first transceiver 118 is provided for relatively long-range communication, up to about 50 m or about 100 m. For example, the first transceiver 118 may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver 118 also includes an encryption module for encrypting sent data and decrypting received data, for example according to the Advanced Encryption Standard (AES) utilizing pre-shared keys. A second transceiver 120 is provided for relatively short-range communications. For example, the second transceiver 120 may use a standard according to IEEE 802.15, such as IEEE 802.15.4, RFID or Near Field Communication (NFC). The second transceiver 120 may operate over a range of less than 5 m, less than 3 m, less than 1 m, less than 50 cm, less than 25 cm, less than 10 cm, less than 5 cm, less than 1 cm or requiring contact between devices. Like the first transceiver 118, the second transceiver 120 also includes an encryption module for encrypting sent data and decrypting received data.

In some examples, a single wireless transceiver may be provided in the wireless communication interface 104. In that case the single transceiver may use relatively short range or relatively long range communication, or adjust the range (such as by controlling transmit power) as required.

Indicator 106 is connected to the processor 102 and controlled by the processor 102 to provide indications to a user of the tire monitoring device 100. In this example the indicator 106 is an LED, but in other examples the indicator is another form of light, a display, such as an LCD or e-ink display, or any other form of visual indication. In other examples, the indicator 106 is an audible indicator, such as a buzzer, beeper, speaker or any other sound generating component. In further examples, the indicator 106 can comprise both audible and visual indication components. The indicator 106 provides at least first and second indications, for example a first colour and a second colour of emitted light. Further indications can also be provided, such as solid or flashing light. The tire monitoring device 100 has a housing (not shown) and the indicator 106 can provide an indication outside the housing, for example the LED may be mounted external to the housing or visible through the housing, or sound may be able to be emitted from within the housing.

The power supply 108 provides power to the elements of the tire monitoring device 100. The power supply 108 may be a battery, such as Lithium battery. In this example, the power supply 108 is a Lithium battery with power sufficient to run the sensor in normal operation for about 2 to 3 years. In other examples the power supply 108 may comprise a power harvesting system, for example harvesting vibration and/or electromagnetic radiation to charge a capacitor or battery which is then used to power the device.

The pressure sensor 110 is connected to processor 102 and may be any suitable sensor for measuring pressure, for example a capacitive sensor. Similarly, the temperature sensor 112 is connected to processor 102 and may be any suitable sensor for measuring temperature, such as thermocouple. The temperature sensor 112 may be arranged to measure the temperature of the wheel or the temperature of the gas inside the tire directly. Where the temperature sensor 112 measures the temperature of the wheel, this can be processed to determine the temperature of the gas in the tire. For example, an algorithm or look-up table may be used.

The connection of the pressure sensor 110 and temperature sensor 112 to the processor 102 may be digital, providing a digital representation of the measured pressure and/or temperature from an Analogue to Digital Convertor (ADC) in the sensor itself, or analogue, in which case the processor may include an ADC to sample the received signal. Including both a pressure sensor 110 and a temperature sensor 112 may be useful to determine a temperature compensated pressure value. Although this example includes a pressure sensor 110 and a temperature sensor 112, other examples may include only a pressure sensor, or may include further sensors.

This example includes two storage elements 114 and 116, which can individually or collectively be referred to as local memory of the aircraft tire monitoring device 100. Storage 114 is non-volatile rewritable storage in this example, such as flash memory which can retain data without requiring applied power. Other examples may include volatile storage, which is kept powered by the power supply, or combinations of read-only and rewritable storage. Storage 114 is connected to the processor 102 and used to store both computer program instructions for execution by the processor and data, such as data from the pressure sensor 110 or received over the wireless communication interface 104. In some examples, storage 114 may store a history of pressure and/or temperature readings sensed by the pressure sensor 110 and the temperature sensor 112. For example, the previous ten days readings may be stored, with the newest data replacing the oldest once the storage is full.

Storage 116 is secure storage to which write and/or read access is restricted, for example only accessible to certain processes running on processor 102. Configuration data, such as wireless encryption keys can be stored in storage 116. In other examples, a single storage may be provided, or storage 114 and 116 may be provided in a single physical device with a logical partitioning between storage 114 and storage 116.

Figure 2:
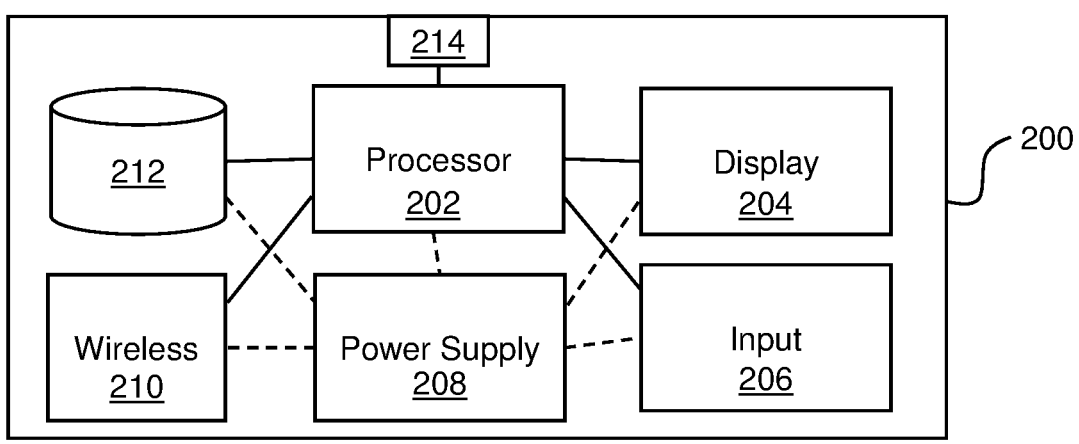
FIG. 2 shows a schematic view of a remote device.

FIG. 2 shows a schematic representation of a remote device 200 for use in conjunction with the tire monitoring device 100 of FIG. 1. The remote device 200 includes a processor 202, a display 204, an input system 206, a power supply 208, a wireless communication interface 210, a storage 212 and wired communication interface 214. In this example the remote device 200 is a mobile device, such as a cellular phone or a tablet computer.

The processor 202 is any suitable processing device, for example a multipurpose microprocessor, system-on-chip, or system in package, which may include one or more processing cores. Processor 202 is connected to the display 204, such an LCD, OLED or e-ink display to display information to a user of the remote device 200.

Input system 206 includes a touch screen interface in this example, allowing a user to interact with the remote device 200 by touching user interface elements on the screen. The input system 206 may include one or more buttons in addition to the touch screen, as well as other input devices, such as a microphone for speech recognition and a camera for image input. Other examples may not include a touch screen interface.

The remote device is powered by power supply 208, which is a rechargeable lithium-ion battery in this example. Other examples may use alternative power supplies, such as other battery technologies, mains power, or energy harvesting, such as solar power.

A wireless interface 210 is included for the remote device 200 to communicate with other devices, such as the tire monitoring device 100. In this example, a single wireless interface 210 is provided which is configured to communicate with the tire monitoring device 100. For example, a relatively long range wireless communication technology can be used, such as one conforming to IEEE 802.15.1, IEEE 802.15.4 or IEEE 802.11. This allows the remote device 200 to interact with the tire monitoring device 100 from a relatively long range.

In other examples, the remote device 200 may be provided with multiple wireless communication interfaces or transceivers, operating with different wireless technologies, such as at least two of IEEE 802.15.1, IEEE 802.15.4, IEEE 802.11 (Wi-Fi), WAIC, RFID and NFC. For example, the remote device 200 may have two transceivers with one having a longer communication range than the other.

Storage 212 includes a non-volatile element, such as flash memory, and a volatile element, such as RAM. The non-volatile element is used to store operating system software and application software. In this example, the remote device 200 runs standard operating system software and is loaded with application software to interact with the tire monitoring device 100. In order to restrict access to the tire monitoring device 100, the application software may be provided from a secure source and not available to the general public, and/or require credentials to be entered before operating.

Wired communication interface 214 is provided for connection to a computing system. The wired communication interface 214 can be for example, a serial data connection, such as Universal Serial Bus (USB), a parallel data connection or a network connection, such as Ethernet. The wired communication interface 214 may allow the remote device 200 to communicate values and/or other status information read from the tire monitoring device 100 to a computing system, for example to store long term trends and assist fleet management. Alternatively, or additionally, wired communication interface 214 may be used for communication with the computing system. In some examples, the remote device 200 may not include a wireless communication interface.

Figure 3:
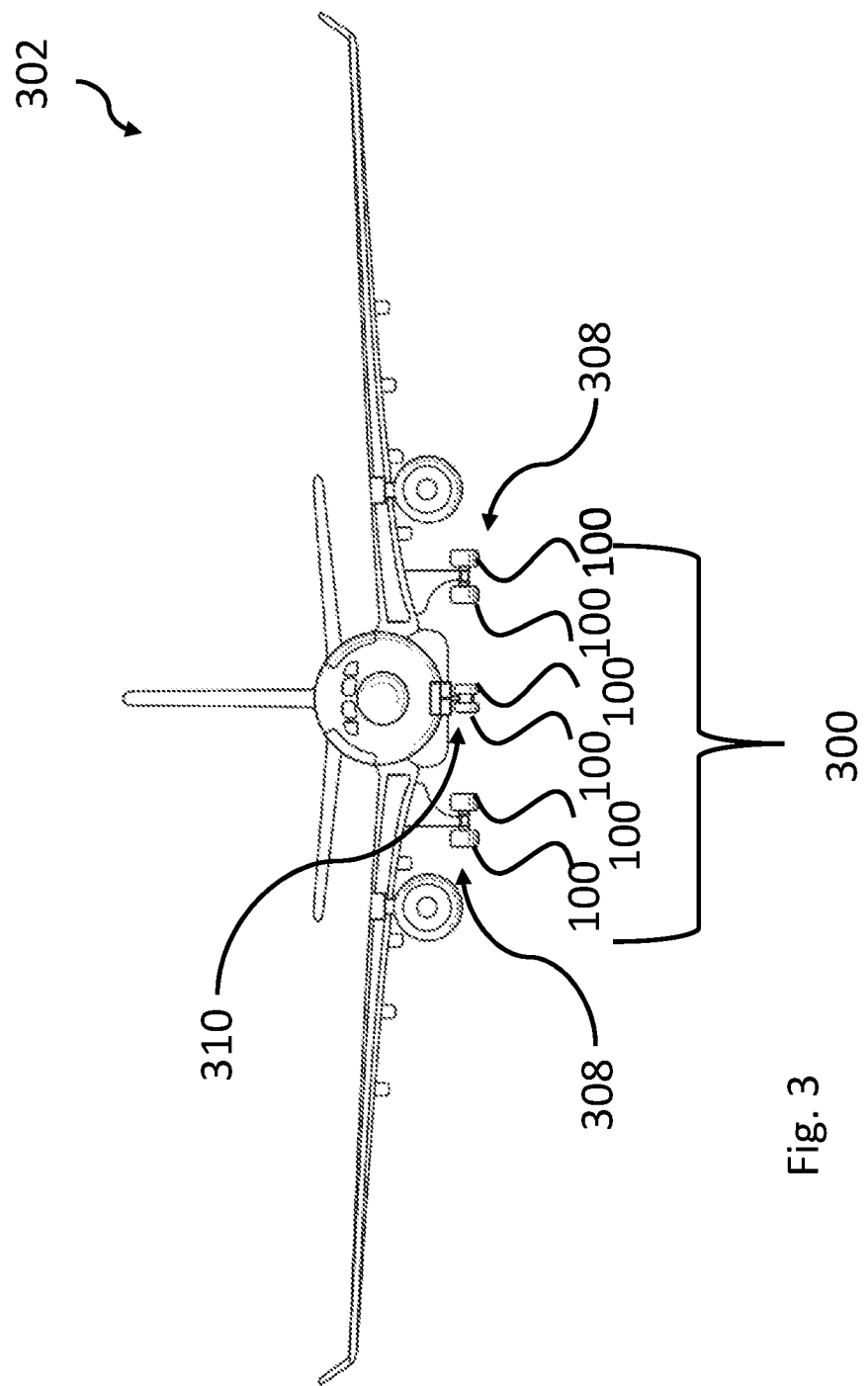
FIG. 3 shows a schematic view of an aircraft.

FIG. 3 shows a schematic representation of a tire pressure sensor network 300 comprising a plurality of tire monitoring devices 100 installed in an aircraft 302. The aircraft 302 comprises main landing gear 308 and nose landing gear 310. The aircraft 302 may be used in conjunction with any of the methods described herein. Tire monitoring devices 100 are installed on each wheel of the main landing gear 308 and nose landing gear 310.

In an example, the tire monitoring devices 100 are also in communication with a cockpit system to provide tire pressure information to the pilots on the flight deck. In these examples, the flight deck console may also function as a remote device.

Figure 4:
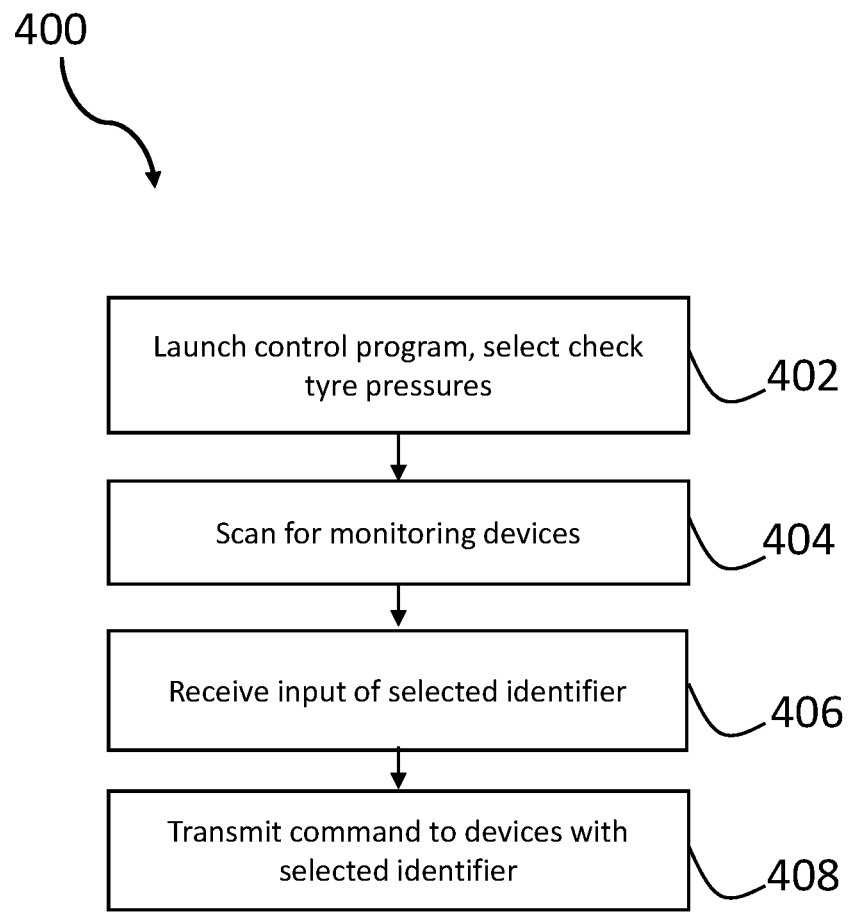
FIG. 4 shows a first method according to an example.

FIG. 4 shows a flow chart of a tire pressure check process that can be used with the tire pressure sensor network 300 of FIG. 3. First, at block 402, a user launches the tire monitoring control application on the remote device 12. During initialization of the application, a check is made that the wireless communication interface 210 for communication with the tire monitoring devices 100 is active on the remote device 200 and the user is prompted to activate if it is not active.

Next, at block 404, the remote device 200 scans for tire monitoring devices 100 in range. For example, the remote device 200 may send out a probe over the wireless communication interface 210. At the same time, the tire monitoring devices 100 are periodically waking and listening for the probe of the remote device, and/or periodically waking and broadcasting respective identification signals, which include aircraft identifiers, such as a tail identifier of an aircraft to which the tire monitoring device 100 is attached.

The scanning may comprise establishing direct, point-to-point contact with each tire monitoring device 100, or contact through the network 300 of tire monitoring devices 100, for example through an access point, a master device, or any device in a mesh network.

Depending on the communication range and location, tire monitoring devices associated with more than one aircraft may be detected. For example, several aircraft may be in the same hanger in range of the remote device 200. At block 406, input is received of a selected identifier.

Next, at block 408, a request or command is sent to the tire monitoring devices 100 corresponding to the selected identifier to cause them to connect to the remote device 200, for example so that they can receive a request from the remote device 200 to carry out a tire pressure check.

Throughout the process of FIG. 4, communication between the remote device 200 and the tire monitoring devices 100 may be secure, for example encrypted by a network key. The network key for the communication with the remote device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 5:
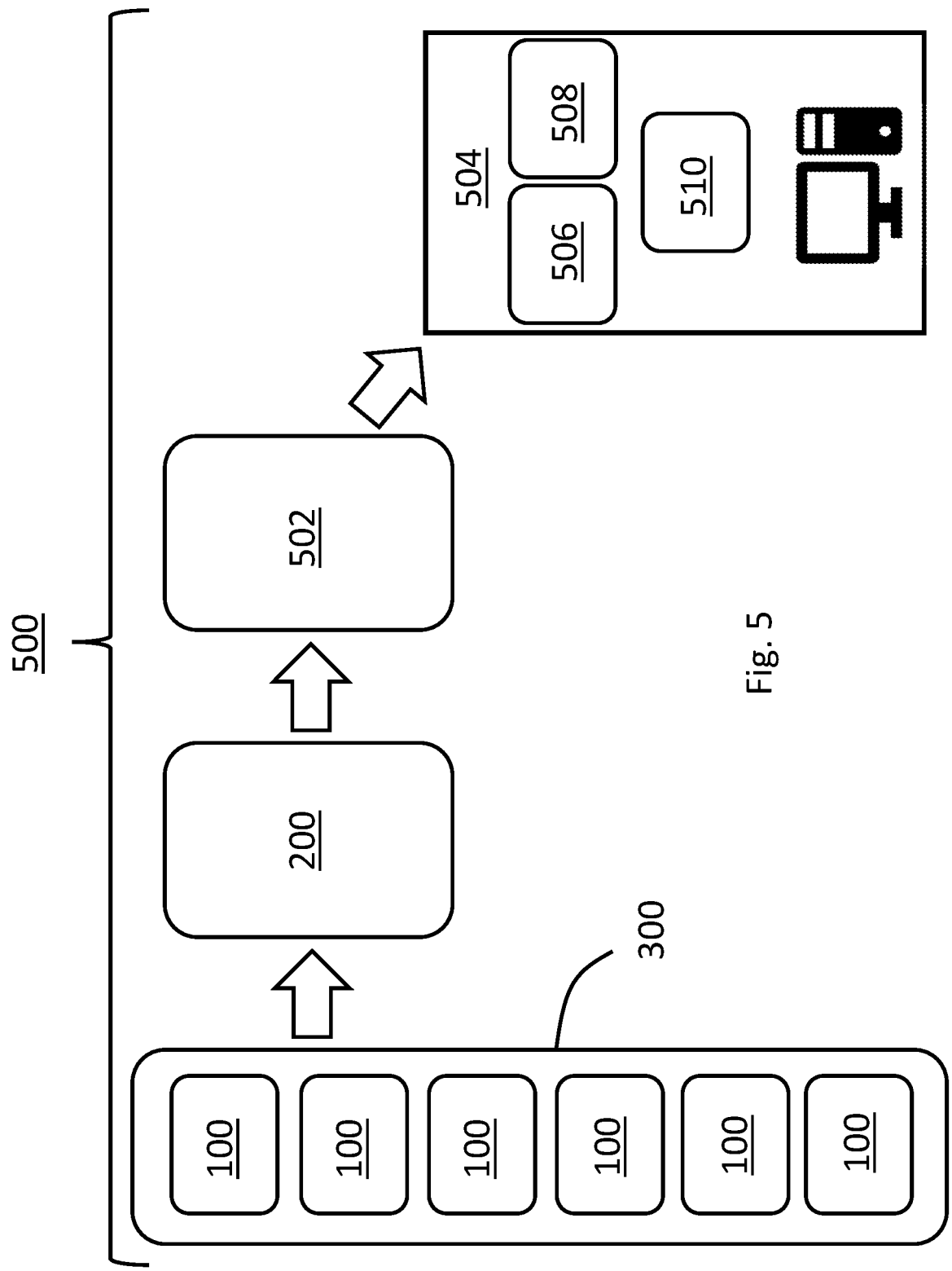
FIG. 5 shows a first schematic view of a tire performance monitoring system.

A tire performance monitoring system 500 that utilises a number of tire pressure sensor networks 300 is illustrated schematically in FIG. 5, and comprises a plurality of tire pressure sensor networks 300 formed of respective pluralities of tire monitoring devices 100, the remote device 200, a remote memory 502, and a remote computing device 504.

The remote memory 502 is disposed remotely from the tire pressure sensor networks 300, and hence the plurality of aircraft tire monitoring devices 100, and the remote device 200, and comprises any memory device capable of storing data associated with the tire pressure sensor networks 300. In some examples the remote memory 502 can comprise a database or the like, for example hosted on a server remote from the tire pressure sensor networks 300, and hence the plurality of aircraft tire monitoring devices 100, and the remote device 200. Although illustrated separately in FIG. 5, it will be appreciated that in some examples the remote memory 502 can comprise part of the remote computing device 504. Similarly, whilst one memory is illustrated, it will be appreciated that in practice the memory may comprise multiple memory devices, for example distributed across physical and/or virtual locations.

The remote computing device 504 is disposed remotely from the tire pressure sensor networks 300, and hence the plurality of aircraft tire monitoring devices 100, and the remote device 200. The remote computing device 504 comprises a processor 506, a display device 508 and a memory 510. Whilst illustrated as a single processor 506, the remote computing device 504 may comprise more than one processor in practice, and similarly the system can additionally or alternatively comprise a plurality of remote computing devices 504 such as a server farm. The display device 508 can comprise a screen capable of displaying a graphical user interface to a user of the remote computing device 504, as will be discussed in more detail hereafter. The memory 510 can comprise any suitable memory device, and stores instructions that, when executed, control the processor 506 to perform various actions.

The tire performance monitoring system 500 can be utilised to process and/or analyse data obtained from the tire pressure sensor networks 300 to provide further detail about aircraft tire performance characteristics of the tires of each of the aircraft 302.

In particular, for a given aircraft 302 each of the respective aircraft tire monitoring devices 100 is configured to wake-up every 10 minutes to measure pressure and temperature values using the respective pressure sensor 110 and temperature sensor 112. Such measured pressure and temperature values are stored in the respective first storage 114 of the aircraft tire monitoring device 100, i.e. in local memory of the aircraft tire monitoring device 100. When a tire pressure check is performed, for example once the aircraft tire monitoring devices 100 are connected to the remote device 200 following an appropriate request or command 408 in accordance with the method 400 described above, the remote device 200 obtains the measured pressure and temperature values from the first storage 114 of the respective aircraft tire monitoring devices 100.

The remote device 200 sends the measured pressure and temperature values, or appropriate values derived from the measured pressure and temperature values, to be stored in the remote memory 502. Such stored values are retrieved by the remote computing device 504, and are processed by the processor 506 of the remote computing device 504. This process occurs for each of the aircraft 302, for example for a fleet of aircraft operated by an operator, with the remote computing device 504, and in particular the display device 508, utilised to communicate information about the fleet of aircraft to the operator.

It will be appreciated that, whilst processing and provision of large amounts of data to an operator may be desirable, such large amounts of data may be unwieldy and provide little value to an operator in practice.

Figure 6:
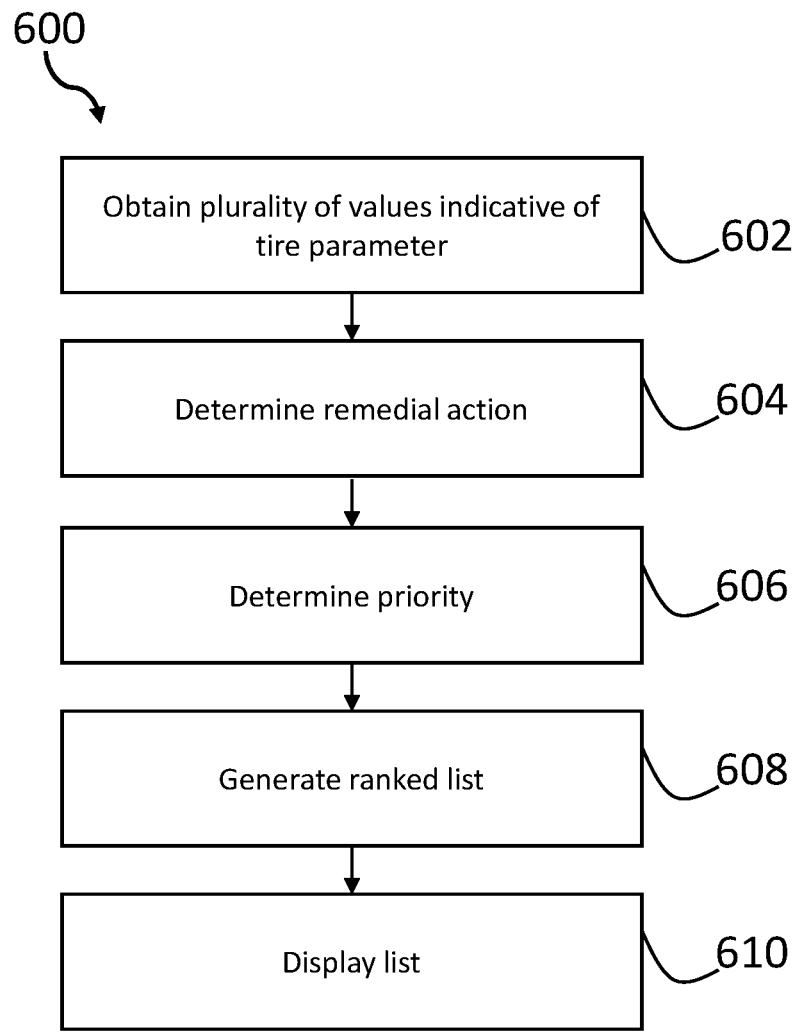
FIG. 6 shows a second method according to an example.

A method 600 in accordance with the present invention is illustrated schematically in the flow diagram of FIG. 6. The method 600 comprises obtaining 602 a plurality of sets of values indicative of tire parameters of aircraft tires, each set of values corresponding to an aircraft comprising a plurality of the aircraft tires. The method 600 comprises determining 604 a remedial action associated with each set of values, and determining 606 a priority associated with the determined remedial actions. The method 600 comprises 608 generating, based on the determined remedial actions, a list of aircraft, the list of aircraft ranked based on the determined priority of remedial action. The method 600 includes 610 displaying the list of aircraft, on a display device, such that aircraft with a relatively higher priority remedial action are shown higher up the list on the display than aircraft with a relatively lower priority remedial action.

By displaying the list of aircraft such that aircraft with a relatively higher priority remedial action are shown higher up the list on the display than aircraft with a relatively lower priority remedial action, a user or operator of the aircraft tire monitoring system may be more easily able to identify those aircraft for which higher priority remedial actions are required, which may facilitate ongoing maintenance procedures for the identified aircraft. This may be an improvement over, for example, user interface systems where aircraft are displayed with remedial actions in a non-ordered fashion or ordered without considering any remedial actions.

In the context of the tire performance monitoring system 500, the processor 506 of the remote computing device 504 obtains the sets of pressure and temperature values for each aircraft 302 from the remote memory 502, for example where a user desires to interrogate such values, and processes the sets of values to determine a time to reinflation of tires for the given aircraft 302. Such time to reinflation is an example of a remedial action. The processor 504 assigns a priority level to each aircraft 302 based on the determined time to reinflation. For example, those aircraft 302 comprising a relatively shorter time to reinflation are assigned a higher priority than those aircraft 302 comprising a relatively longer time to reinflation. The processor 504 then automatically generates a list of aircraft 302 based on the determined times to reinflation and associated priorities, with those aircraft 302 having a relatively higher priority located further up the list than those aircraft 302 having a relatively lower priority. The processor 504 then automatically causes the list to be displayed on the display device 508, for example with the processor 504 causing running of an application that presents a graphical user interface on the display device 508.

Figure 7:
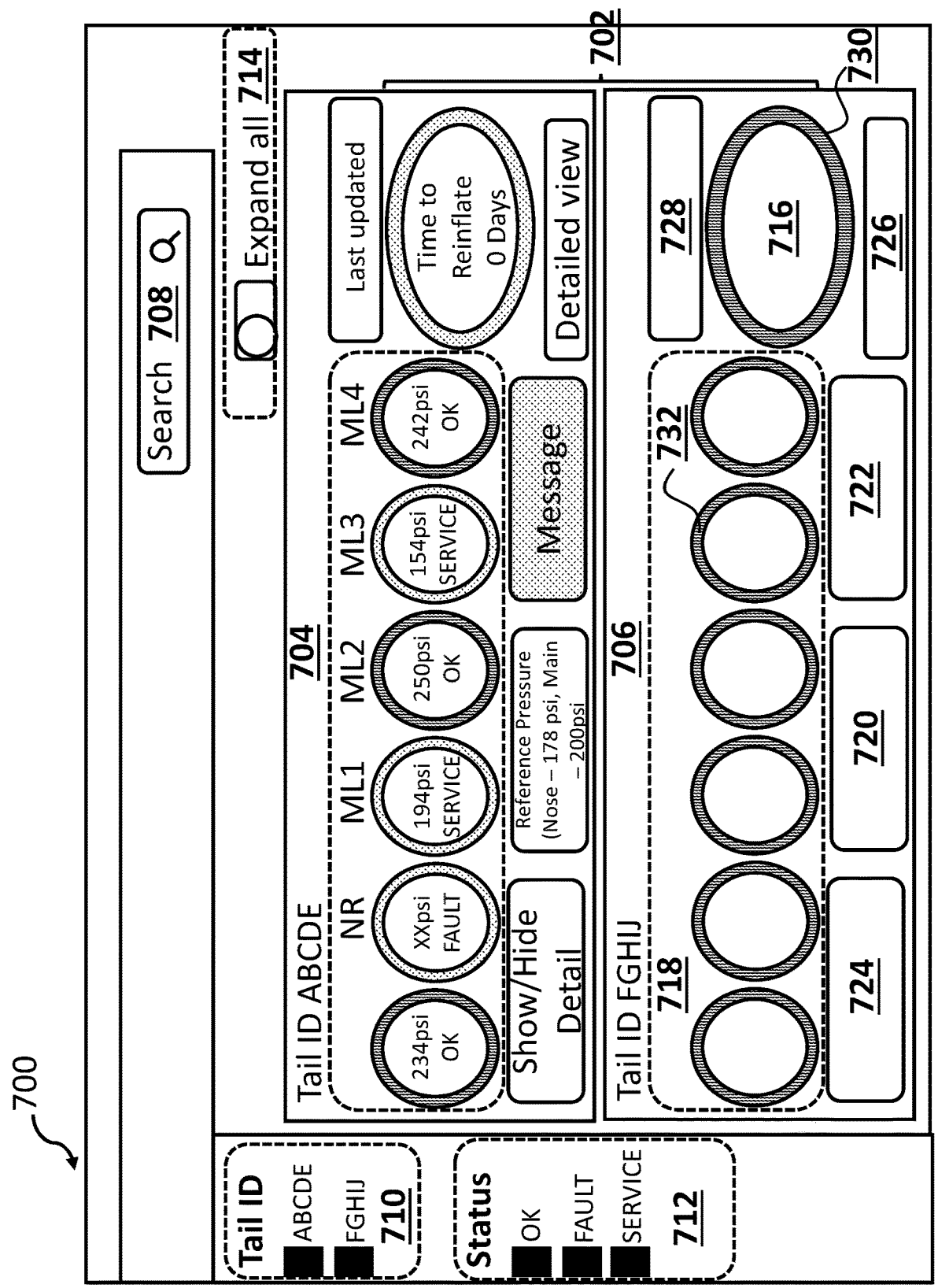
FIG. 7 shows a first schematic view of a first display pane for a display device forming part of a tire performance monitoring system.

A first display pane 700 of such a graphical user interface is illustrated schematically in FIG. 7. The first display pane 700 comprises a list 702 of aircraft 302, having first 704 and second 706 entries. Here the first entry 704 is illustrated with exemplary text content, whilst the second entry 706 is illustrated using corresponding reference numerals for clarity. It will be appreciated that in practice the list can comprise many more entries, which may not all be displayed at once. For example, with the first display pane 700 scrollable in a downward direction of FIG. 7 to display further entries in the list 702, and/or navigable to transition between two or more pages of results. The list 702 may generated automatically in response to a request, such as by following the method of FIG. 6. The list 702 may also be maintained ready for display in response to a request. In both cases, the processor 504 can also update the list 702, for example by moving the position of an aircraft 302 within the list 702 where an updated priority of remedial action, and/or a new aircraft 302, is determined. New and/or updated data may be determined by polling the remote memory, for example.

As well as the list 702, the first display pane 700 comprises a search bar 708, an aircraft tail ID filter 710, a status filter 712, and an expansion toggle 714.

The search bar 708 can, for example, enable searching by aircraft tail ID number, or indeed searching based on any number of other categories. The aircraft tail ID filter 710 comprises a list of aircraft tail ID numbers, each with an associated check box that can be ticked/filled or unticked/unfilled to cause display of, or removal of, the associated aircraft from the list 702. As depicted in FIG. 7, all check boxes in the aircraft tail ID filter 710 are filled so all aircraft are displayed. Similarly, the status filter 712 comprises a list of statuses corresponding to statuses of tire monitoring devices 100 of aircraft 302 in the list 702, each with an associated check box that can be ticked/filled or unticked/unfilled to cause display of, or removal of, the associated aircraft from the list 702. As depicted in FIG. 7, all check boxes in the status filter 712 are filled so aircraft of all status are displayed. The expansion toggle 714 can cause all entries 704, 706 in the list 702 to be expanded in a manner that will be discussed in more detail below.

Each of the first 704 and second 706 entries on the list 702 comprises the same displayed information, with each entry 704,706 comprising a time to reinflate display region 716, a value and status display region 718, a reference pressure display region 720, a message icon 722, a show/hide detail icon 724, a detailed view icon 726, and an update status display region 728.

The time to reinflate display region 716 displays a "Time to Reinflate X Days" message, with X an integer value that is illustrated as 0 days for the first entry 704 in the list 702. In FIG. 7, the text in the time to reinflate display region of the second entry 706 on the list 702 is not shown but is 2 days in this example. As indicated above, the list 702 is ordered based on the time to reinflate status for each aircraft 302, e.g. with the processor 506 arranging the aircraft 302 in the list 702 based on their determined priority of time to reinflation. The time to reinflate display region 716 has an associated visual indicium 730 in the form of a coloured box that surrounds the "Time to Reinflate X Days" message. Here the visual indicium 730 is a binary visual indicium, in that it can be either in a red state or a green state depending on the determined priority of the time to reinflate, although visual indicia with a greater number of states, for example three states (red, amber, green), and/or different colours are also envisaged. Red is illustrated in the figures with dotted shading, whilst green is indicated in the figures with line shading. Here a high priority remedial action is the "Time to Reinflate 0 Days" message of the first entry 704 of the list 702, which has an associated visual indicium 730 in the form of a red border surrounding the message. A lower priority remedial action can be a "Time to Reinflate 2 Days" message for the second entry 706 of the list 702, which has an associated visual indicium 730 in the form of a green border surrounding the message.

The value and status display region 718 displays values and statuses associated with each tire, i.e. with each aircraft tire monitoring device 100, of an aircraft 302. As illustrated in FIG. 7, values and status for each of a left nose landing gear NL, a right nose landing gear NR, and first through fourth main landing gears ML1-4, are displayed in the value and status display region 718. Here the values displayed for each aircraft tire monitoring device 100 comprise a most recent pressure reading, e.g. a most recent psi value, measured by the aircraft tire monitoring device 100. The psi value may be the value as measured or expressed at a reference temperature using data from the temperature sensor.

The status messages for a given aircraft tire monitoring device 100 can comprise one of a pre-determined list of status messages. Status messages can include, for example, an OK message indicating that the pressure value is above a reference pressure value with no remedial action required, a FAULT message indicating that a pressure reading is not obtainable and that remedial action is required, and a SERVICE message indicating that the pressure value is below the reference pressure value with remedial action required. Remedial actions in this case can include, for example, any of checking or servicing an aircraft tire monitoring device 100 and replacing an aircraft tire monitoring device 100.

A visual indicium 732 is provided for each value and status combination, with such visual indicia taking the form of a coloured ring that surrounds the corresponding value and status message. Here the visual indicium 732 is a binary visual indicium, in that it can be either in a red state or a green state depending on a determined priority of the status or a remedial action associated with the status, although visual indicia with a greater number of states, for example three states (red, amber, green), are also envisaged. Here a high priority status/remedial action include the FAULT or SERVICE status of the first entry 704 of the list 702, which have an associated visual indicium 732 in the form of a red ring surrounding the message. A lower priority status/remedial action includes the OK statuses of the first entry 704 of the list 702, which have an associated visual indicium 732 in the form of a green ring surrounding the message.

In some examples, the statuses/associated remedial actions can be utilised as secondary determiners for ordering of the list 702. For example, aircraft 302 with a relatively higher number of remedial actions such as checking or replacing the aircraft tire monitoring device can be included further up the list than those aircraft with a relatively lower number of remedial actions. Similarly, aircraft 302 with a relatively higher number of higher priority remedial actions such as checking or replacing the aircraft tire monitoring device can be included further up the list than those aircraft with a relatively lower number of higher priority remedial actions.

The reference pressure display region 720 displays reference pressure values for the tires of the given aircraft 302. As illustrated in FIG. 7, for each of the first 704 and second 708 entries on the list message of "Reference Pressure (Nose—178 psi, Main—200 psi) is displayed in the reference pressure display region 720. Reference pressures may be stored in association with the retrieved data and provided by the tire monitoring devices 100 along with the data when it is provided from the internal memory 114. Alternatively, reference pressures may be stored in association with an aircraft tail ID and/or an aircraft model and retrieved separately.

The update status display region 728 displays a time and date at which the list entry was last updated.

The message icon 722 comprises a selectable icon, which is itself displayed with a status that indicates whether or not there are any messages to be displayed by selecting the selectable icon. For example, for the second entry 706 of the list 702 may have a status of "No Messages" indicated with the selectable icon also shown in green colouring. User selection of the message icon 722 for the second entry 706 of the list 702 will not result in any further action.

For the first entry 704 of the list 702, a status of "Message" is indicated with the selectable icon also shown in red colouring, although other examples may use other colours than red. User selection of the message icon 722 for the first entry 704 of the list 702 results in a pop-up box 734 being displayed on the first display pane 700, as shown schematically in FIG. 8, where like reference numerals are used for the sake of clarity.

Figure 8:
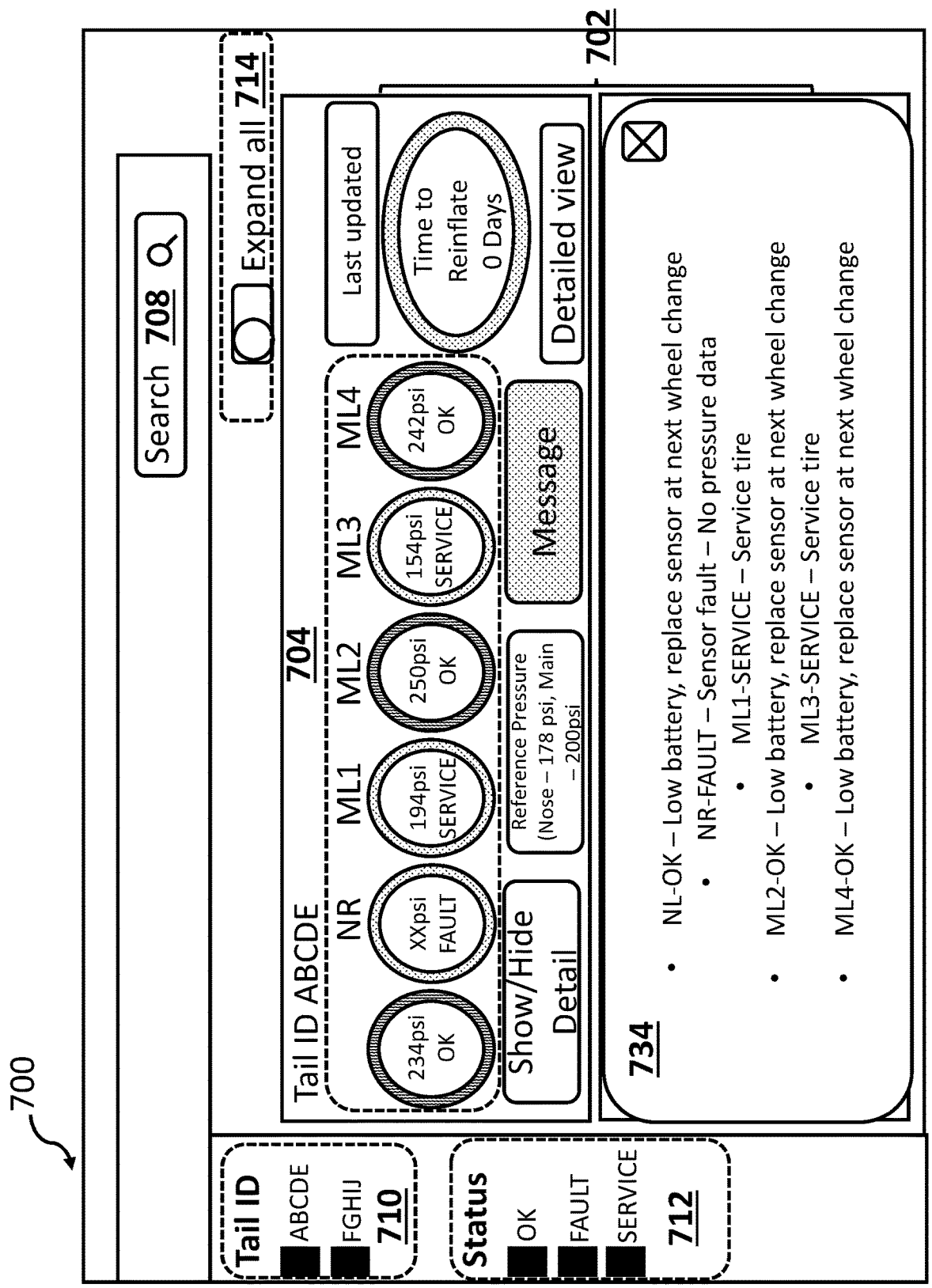
FIG. 8 shows a second schematic view of the first display pane.

The pop-up box 734 displays further detailed messages associated with each of the tires and/or aircraft tire monitoring devices 100 for the given aircraft 302. The messages are shown in FIG. 8 grouped by wheel group, although in other examples the messages may be ordered by a priority of the corresponding status message, for example with those messages corresponding to higher priority status messages displayed closer to the top of the pop-up box 734. As illustrated in FIGS. 7 and 8, the left nose landing gear NL has a value of 234 psi and a status message of OK. The corresponding message on the pop-up box 734 reads "NL—OK", but also provides the further detailed message "Low battery, replace sensor at next wheel change". Display of battery status in such a manner may avoid cluttering of the first display pane 700 with information deemed to be of relatively low priority.

As illustrated in FIGS. 7 and 8, the right nose landing gear NR has a value of XX psi and a status message of FAULT. The corresponding message on the pop-up box 734 reads "NR—FAULT", but also provides the further detailed message "Sensor fault—No pressure data". This can prompt an operator to ensure that operation of the aircraft tire monitoring device 100 is checked to determine the fault and whether further remedial action is required.

As illustrated in FIGS. 7 and 8, the main landing gear ML1 has a value of 194 psi and a status message of SERVICE. The corresponding message on the pop-up box 734 reads "ML1—SERVICE", but also provides the further detailed message "Service tire". This may indicate that remedial action, e.g. reinflation of the tire, is required.

As illustrated in FIGS. 7 and 8, the main landing gear ML2 has a value of 250 psi and a status message of OK. The corresponding message on the pop-up box 734 reads "ML2—OK", but also provides the further detailed message "Low battery, replace sensor at next wheel change".

As illustrated in FIGS. 7 and 8, the main landing gear ML3 has a value of 154 psi and a status message of SERVICE. The corresponding message on the pop-up box 734 reads "ML3—SERVICE", but also provides the further detailed message "Service tire". This may indicate that remedial action, e.g. reinflation of the tire, is required. In some examples, such a low pressure value may indicate that replacement of the tire, or indeed an associated tire on the same wheel axle, is required.

As illustrated in FIGS. 7 and 8, the main landing gear ML4 has a value of 242 psi and a status message of OK. The corresponding message on the pop-up box 734 reads "ML4—OK", but also provides the further detailed message "Low battery, replace sensor at next wheel change".

As can be seen in FIG. 8, the pop-up box 734 may use a respective indentation for each status. For example, in FIG. 8, first, second, and third indentations are associated with the "OK", "FAULT" and "SERVICE" status, respectively. This may facilitate identification of higher priority actions among the wheels of an aircraft.

In some examples, the message or status message can comprise a hyperlink that takes an operator to an associated remedial action. For example, such a hyperlink may take a user to an electronic version of an aircraft maintenance manual (AMM), which may include airworthiness instructions for the aircraft 302. In other examples, the status message may simply direct a user to look-up a relevant section of an AMM.

Whilst particular statuses and messages have been discussed above, it will be appreciated that further statuses and/or more detailed messages are also envisaged as appropriate.

The show/hide detail icon 724 comprises a selectable icon that, when selected by a user, causes expansion of the given entry 704,706 of the list 702 to show further detail associated with the entry 704,706.

Figure 9:
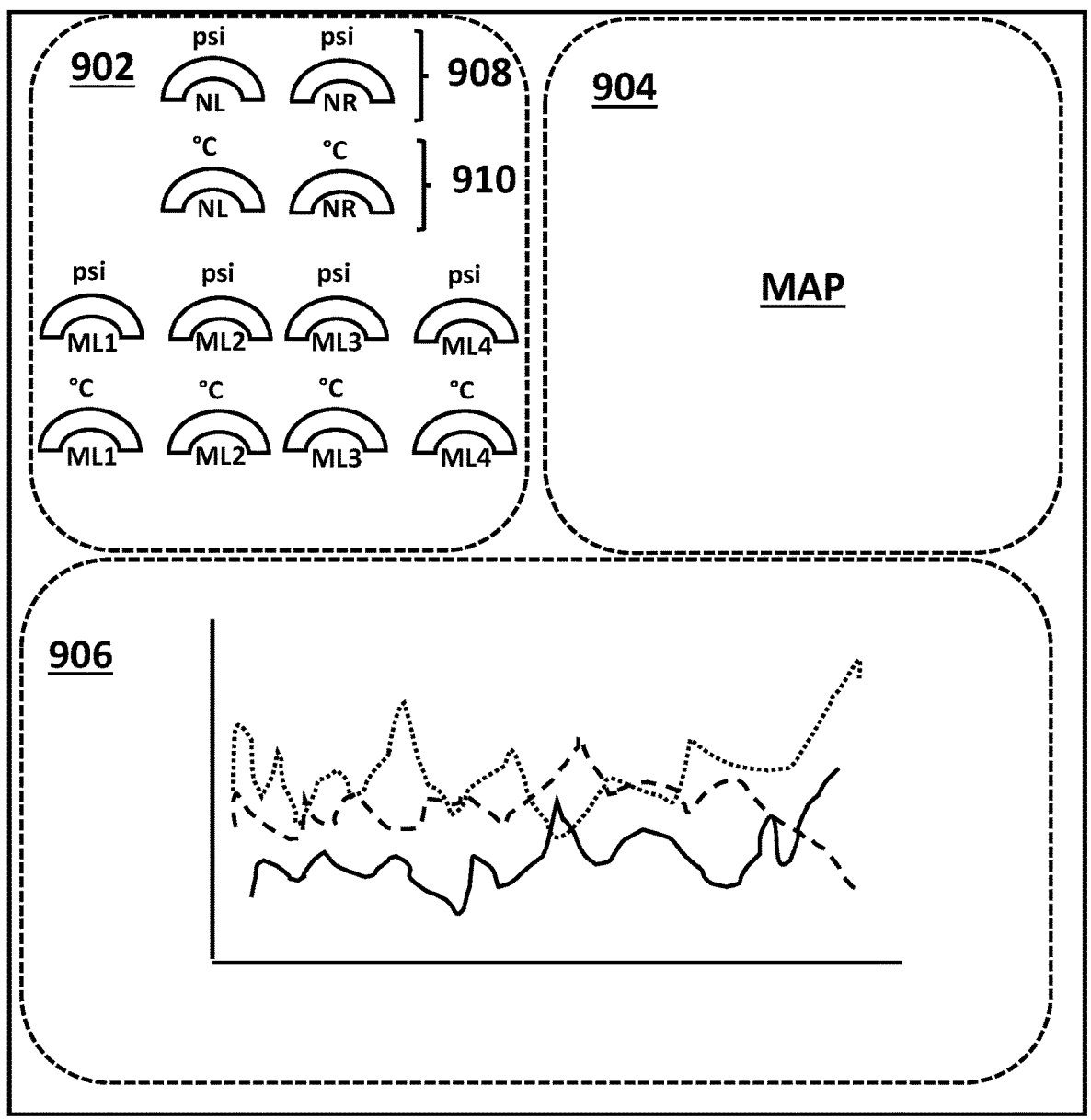
FIG. 9 shows a schematic view of information to be displayed as part of an expanded list entry to be displayed on the first display pane.

Exemplary such further detail for the first entry 704 of the list 702 is illustrated schematically in FIG. 9. Here the expanded list entry 704 comprises a pressure and temperature display region 902, a location information display region 904 and a data profile display region 906.

The pressure and temperature display region 902 displays pressure and temperature values to a user via corresponding pressure 908 and temperature 910 gauges. Such gauges can comprise visual indicia that provide information including any of upper and lower limits for values, reference pressure or temperature values, and current pressure or temperature values. Such visual indicia can be colour coded to correspond to the status messages for a given aircraft tire monitoring device 100 in a manner similar to that previously discussed in respect of the visual indicum 732.

The location information display region 904 displays location information corresponding to a location at which the pressure and temperature values displayed in the pressure and temperature display region 902 were measured. As illustrated in FIG. 9, the location information comprises a map indicating location at which the measurements took place and/or were provided by the tire monitoring device for storage in the remote memory. It will be appreciated that further detail regarding the location, including for example any of an airport name associated with the location, location coordinates, date and time, can be displayed in the location information display region 904.

The data profile display region 906 displays a snapshot of pressure and temperature profiles utilising measured pressure and temperature values around the time at which the tire pressure check that resulted in the values displayed in the pressure and temperature display region 902 was performed. Here the profile takes the form of a graph illustrating pressure and temperature values over time for each of the wheels of the given aircraft 302. In some examples the snapshot can be static or fixed, whereas in other examples the snapshot can be interactive, for example enabling a user to filter by any of date, time, wheel, pressure, and temperature.

Figure 10:
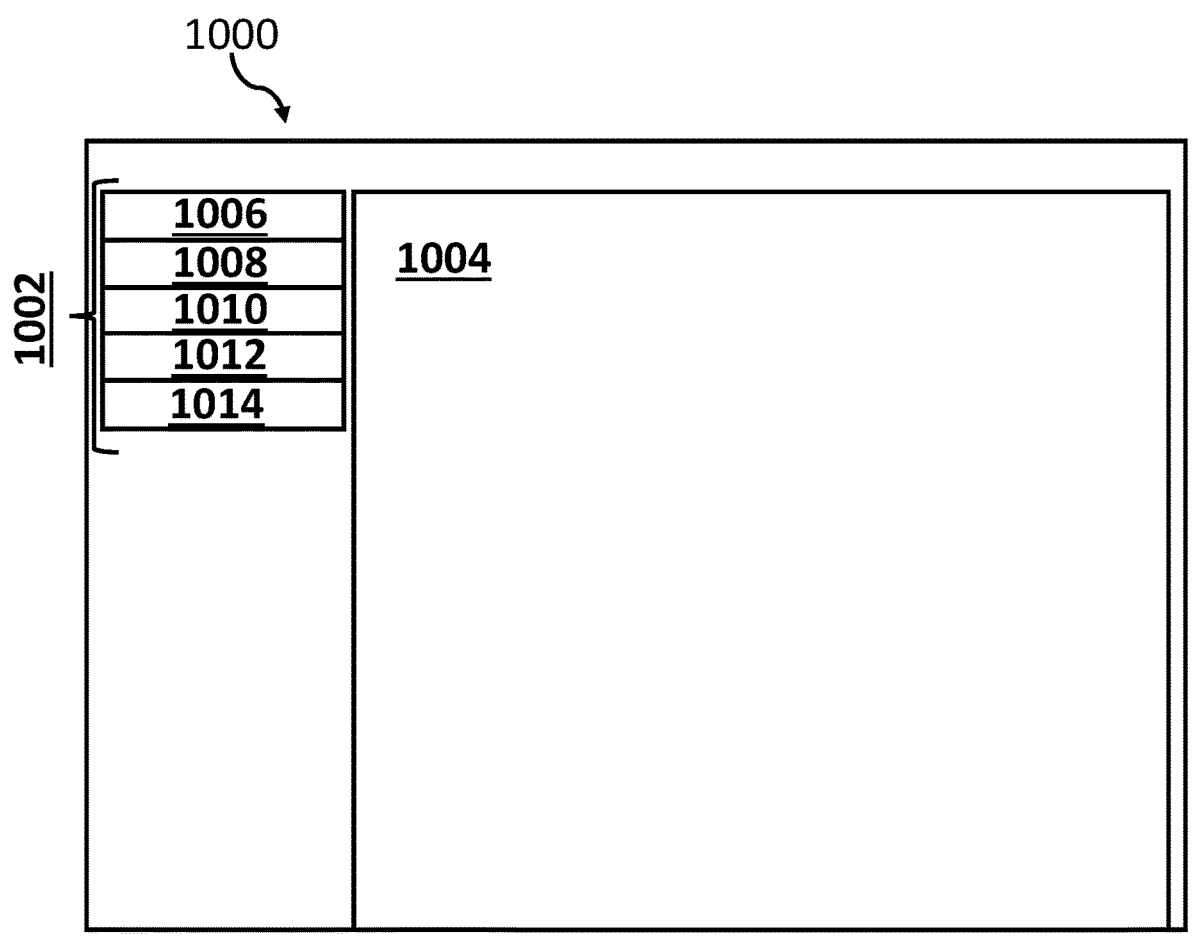
FIG. 10 shows a first schematic view of a second display pane for a display device forming part of a tire performance monitoring system.

Referring back to FIG. 7, the detailed view icon 726 comprises a selectable icon that, when selected, causes display of a second display pane 1000, with the second display pane 1000 illustrated schematically in FIG. 10. It will be appreciated that there is a different second display pane 1000 for each aircraft 302 in the list 702.

The second display pane comprises a plurality of selectable tabs 1002, and a display region 1004 located adjacent to the plurality of selectable tabs 1002.

The plurality of selectable tabs 1002 comprises an "overall data" tab 1006, a "temperature and pressure info" tab 1008, a "temperature and pressure profile" tab 1010, a "local airport information" tab 1012, and a "message information" tab 1014. Other tabs are also envisaged, and different tabs can be provided dependent on aircraft operator requirements. Further exemplary tabs include a wheel tracking tab, a tire tracking tab, and a tire health tab. Some examples may allow customisation of the displayed tabs, for example by a settings screen.

Selection of the overall data tab 1006 causes the most recent pressure and temperature values, along with the location at which such values were measured, to be displayed in the display region 1004. This can take the form of the information displayed in the pressure and temperature display region 902 and the location information display region 904 illustrated schematically in FIG. 9. Other information that can be displayed on the overall data tab 1006 includes, for example, whether an update for an application running on the remote device 200 is available, whether one or more remote devices 200 utilised by an operator requires updating, and reminders regarding maintenance of the remote device 200.

Selection of the temperature and pressure info tab 1008 causes the most recent pressure and temperature values to be displayed in the display region 1004. The most recent pressure and temperature values can be displayed using gauges similar to those depicted in the pressure and temperature display region 902 of FIG. 9.

Figure 11:
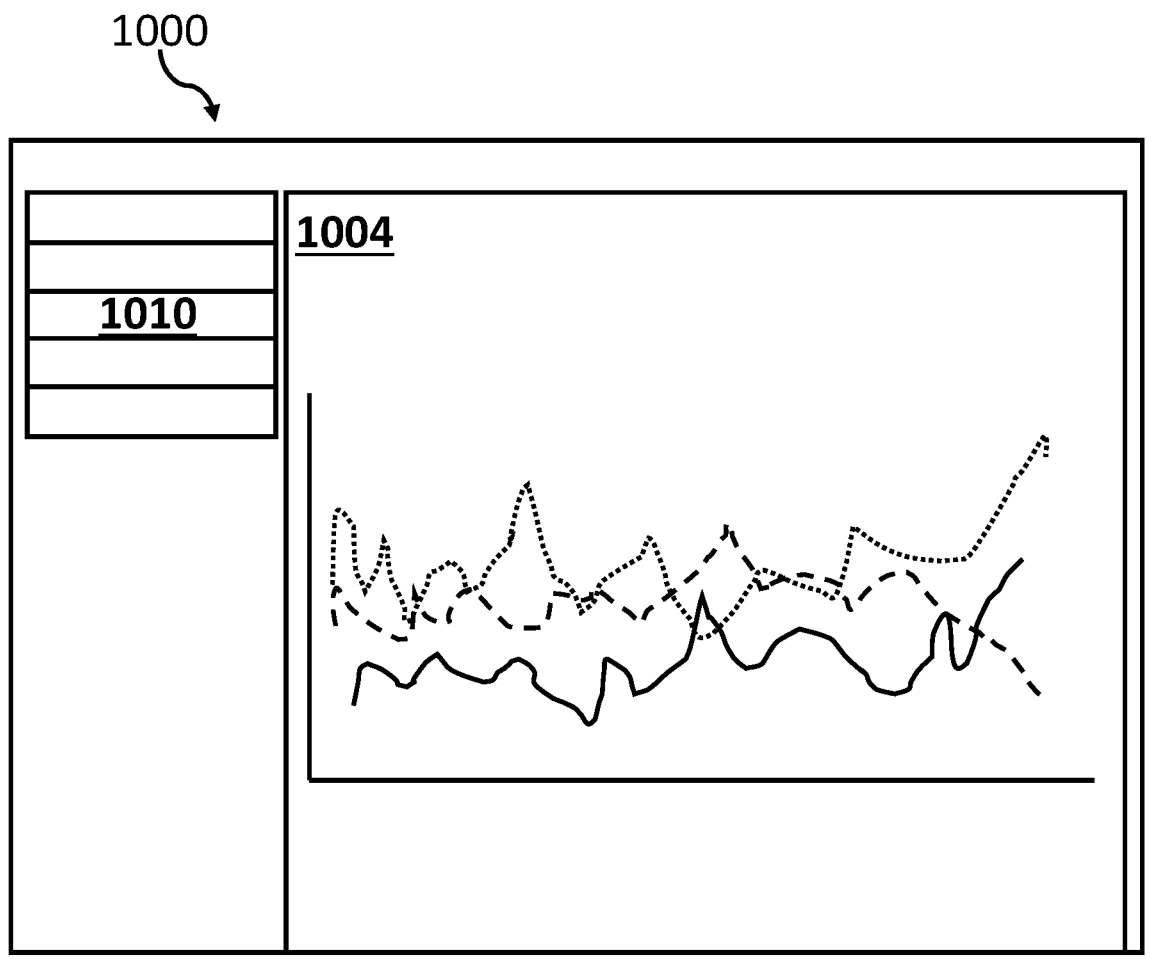
FIG. 11 shows a second schematic view of the second display pane.

Selection of the temperature and pressure profile tab 1010 causes display of temperature and pressure profiles, in the form of graphs, in the display region 1004. This is illustrated schematically in FIG. 11, where like reference numerals are used for the sake of clarity. Here separate graphs are provided for nose landing gear NL and NR of the aircraft 302 and for main landing gear ML1-4 of the aircraft 302.

The graphs illustrate pressure and temperature profiles for tires of the aircraft 302 over a prior 10 day period. The graphs may be interactive to enable filtering of data, alteration of timescales, exporting of data, and any other appropriate functionality.

Figure 12:
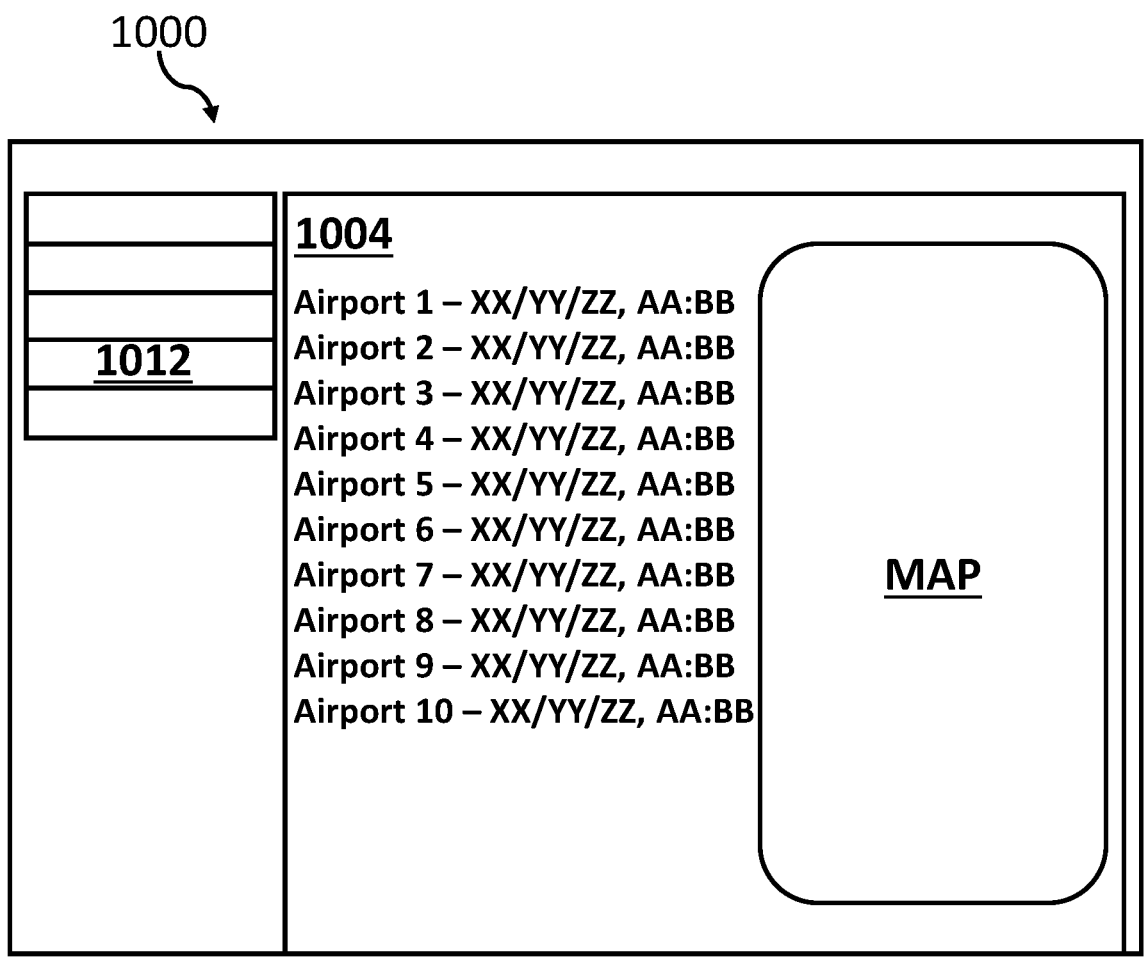
FIG. 12 shows a third schematic view of the second display pane.

Selection of the local airport information tab 1012 causes display of recent location information corresponding to the last 10 tire pressure checks, for example tire pressure checks made by maintenance personnel using the remote device 200, in the display region 1004. This is illustrated schematically in FIG. 12, where like reference numerals are used for the sake of clarity. Here a list of the last 10 airports at which tire pressure checks were performed is displayed, alongside date and time information, in the format XX/YY/ZZ and AA:BB, as to when the pressure and temperature measurements were made at that airport, with each entry on the list clickable to cause the geographic location of the airport to be displayed on a map. Airport names are not illustrated in FIG. 12, as in some examples such data may not be readily available from the information obtained from the aircraft tire monitoring devices 100 or remote device 200, whereas location coordinates may be. However, in other examples airport name data may be determined and displayed based on obtained location coordinates, for example. More than 10 airports may be displayed in some examples, for example with the list of airports being scrollable. In some examples, the list of airports may be ordered with those corresponding to most recent tire pressure checks first, although other orderings are also envisaged.

Display of such historic location data may enable a user to identify if and when particular issues are occurring at particular airports, thereby enabling a user to take appropriate remedial action. In some examples, further detail may be included in the list of airports, or by selecting an entry in the list of airports. For example, events such as remedial actions, including tire inflation may be displayed. Additionally or alternatively, information such as the corresponding pressure and temperature values for the tire pressure check made at that particular airport may be displayed.

Figure 13:
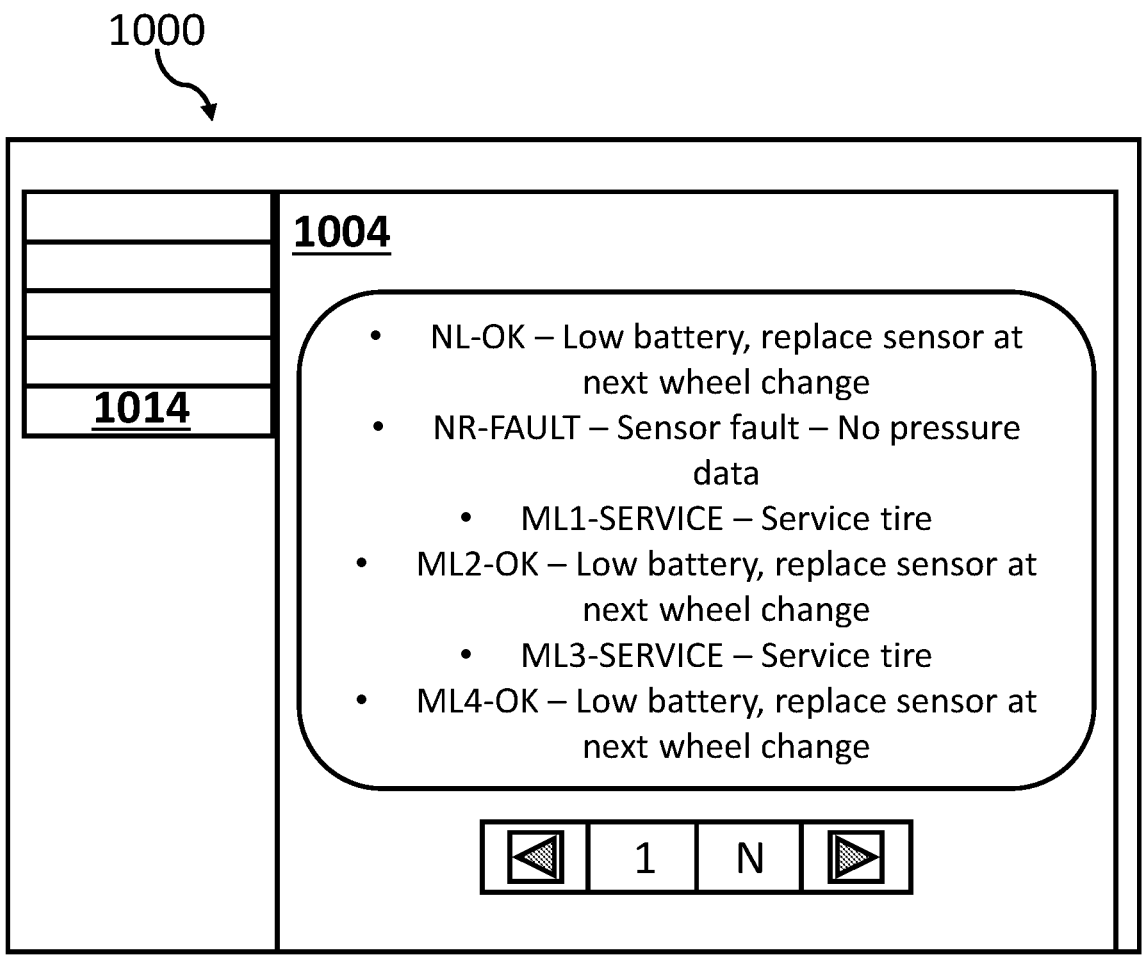
FIG. 13 shows a third schematic view of the second display pane.

Selection of the message information tab 1014 causes message history for the given aircraft 302 to be displayed in the display region 1004. This is illustrated schematically in FIG. 13, where like reference numerals are used for the sake of clarity. Here message history is displayed in the form of a list, with the list ordered by date and time, such that most recent messages are shown first. It will be appreciated that examples are envisaged where message data may be ordered differently, for example by using filters or the like. In some examples the most recent messages can be indicated to a user, for example via use of highlighting or the like.

In the list of message history, date and time information are provided for each entry, alongside the relevant status message and any more detailed remarks. For example, the list of message history can comprise a modified, e.g. extended, version of the further detailed messages displayed using the pop-up box 734 discussed previously. A coloured visual indicium is provided alongside each status message for ease of identifying status messages associated with determined remedial actions. A user may investigate the message history to, for example, identify recurring issues and trends.

The first 700 and second 1000 display panes discussed above may facilitate ongoing maintenance of tires and/or aircraft tire monitoring devices 100 for a fleet of aircraft 302 operated by an operator. By displaying the list 702 of aircraft 302 such that aircraft 302 with a relatively higher priority remedial action are shown higher up the list 702 on the display device 508 than aircraft 302 with a relatively lower priority remedial action, a user of the aircraft tire monitoring system 500 may be more easily able to identify those aircraft 302 for which higher priority remedial actions are required, which may facilitate ongoing maintenance procedures for the identified aircraft 302. The processor 506 ranking and sorting the positions of the aircraft 302 in the list 702, with such a list 702 then automatically being displayed to the user, may be an improvement over, for example, user interface systems where aircraft are displayed with remedial actions in a non-ordered fashion or sorted without considering remedial actions.

By displaying both measured pressure values and reference pressure values in an entry for the list 702, a user may be easily able to identify high and/or low pressures through simple visual comparison of data, thereby facilitating determination of an appropriate maintenance action to be taken. Use of coloured visual indicia, for example binary visual indicia, may facilitate determination of an appropriate maintenance action and provide a simple visual flag to a user. Display of status messages for a given aircraft can again facilitate determination of an appropriate maintenance action and provide a simple visual flag to a user. By providing expandable list entries and/or by providing selectable icons to take a user to a further display pane, and initial display pane can be kept visibly clear and can reduce an amount of time taken for a user to digest information and determine an appropriate maintenance action.

Maintenance actions as discussed herein can comprise one or more of causing a maintenance procedure to be performed, performing a maintenance procedure, and checking that a maintenance procedure has already been performed.

It is noted that the term "or" as used herein is to be interpreted to mean "and/or", unless expressly stated otherwise.

The invention claimed is:

1. An aircraft tire monitoring system comprising:
   tire monitoring devices mounted to each wheel of a plurality of wheels on each aircraft in a plurality of aircraft, wherein each of the tire monitoring devices is configured to generate tire data indicating a condition of a tire on the respective wheel to which the tire monitoring device is attached, the plurality of wheels includes at least one nose gear wheel and a plurality of main gear wheels and the number of the main gear wheels is greater than the number of the at least one nose gear wheel;
   a remote computer system including a processor; and a data carrier comprising machine readable instructions that are executed by the processor and cause the processor to perform operations comprising:
   obtaining the tire data transmitted by the tire monitoring devices on each of the wheels for each of the aircraft, and grouping the tire data by aircraft to generate a set of values of the condition of each of the tires for each of the wheels on each of the plurality of aircraft;
   determining a remedial action associated with each of the sets of values;
   determining a priority associated with the determined remedial actions;
   generating, based on the determined remedial actions, a list of the plurality of aircraft, the list ranking the aircraft of the plurality of aircraft based on the determined priority of remedial action; and
   causing a display device to display the list ranking the aircraft, such that the aircraft with a relatively higher priority remedial action are shown higher up the list on the display than aircraft with a relatively lower priority remedial action.

2. The aircraft tire monitoring system according to claim 1, wherein the instructions, when executed, cause the processor to perform actions comprising:
causing the display device to display, for each aircraft in the list, the corresponding set of values.

3. The aircraft tire monitoring system according to claim 1, wherein the tire parameters comprise tire pressures of associated aircraft tires, and the instructions, when executed, cause the processor to perform operations comprising:
causing the display device to display, for each aircraft in the list, an associated reference pressure for the corresponding aircraft tires.

4. The aircraft tire monitoring system according to claim 1, wherein the instructions, when executed, cause the processor to perform actions comprising:
causing the display device to display, based on the determined priority of the remedial action, a visual indicium for each remedial action, the visual indicium configured to take one of at least a first state and a second state based on the determined priority.

5. The aircraft tire monitoring system according to claim 1, wherein the instructions, when executed, cause the processor to perform actions comprising:
causing the display device to display, for each aircraft in the list and associated aircraft tires, a status message based on the determined remedial actions.

6. The aircraft tire monitoring system according to claim 1, wherein the instructions, when executed, cause the processor to perform actions comprising:
determining, based on a status of the tire monitoring devices, corresponding further remedial actions.

7. The aircraft tire monitoring system according to claim 6, wherein the instructions, when executed, cause the processor to perform actions comprising:
determining a further priority associated with each of the determined further remedial actions; and
causing the display device to display, based on the determined further priorities, a further visual indicium for each aircraft tire, the further visual indicium configured to take one of at least a first state and a second state depending on the determined further priority.

8. The aircraft tire monitoring system according to claim 6, wherein the determined further remedial actions comprise one or more of checking the tire monitoring device, and replacing the tire monitoring device.

9. The aircraft tire monitoring system according to claim 6, wherein the instructions, when executed, cause the processor to perform operations comprising:
generating, based on the determined further remedial actions, the list of aircraft; and
causing the display device to display the list of aircraft, such that at least one of:
aircraft with a relatively higher priority remedial action are shown higher up the list on the display than aircraft with a relatively lower priority remedial action, and
aircraft with a higher number of determined further remedial actions are shown higher up the list on the display than aircraft with a lower number of determined further remedial actions.

10. The aircraft tire monitoring system according to claim 6, wherein the instructions, when executed, cause the processor to perform operations comprising:
generating, based on a type of the determined further remedial actions, the list of aircraft, each type of determined further remedial action having an associated priority; and
causing the display device to display the list of aircraft, such that at least one of:
aircraft with a relatively higher priority remedial action are shown higher up the list on the display than aircraft with a relatively lower priority remedial action,
aircraft with a higher number of determined further remedial actions are shown higher up the list on the display than aircraft with a lower number of determined further remedial actions, and
aircraft with a greater number of relatively higher priority determined further remedial actions are shown higher up the list on the display than aircraft with a lower number of relatively lower priority determined further remedial actions.

11. The aircraft tire monitoring system according to claim 1, wherein the instructions, when executed, cause the processor to perform actions comprising:
causing the display device to display the list such that each entry of the list is expandable to display further detail associated with the corresponding set of values, the further detail comprising one or more of:
a visual gauge indicator associated with the corresponding tire parameter,
a location associated with the corresponding tire parameter,
a tire parameter profile based on historical tire parameter readings for a given tire, and
a message log comprising messages associated with status messages for the associated aircraft tires.

12. The aircraft tire monitoring system according to claim 1, wherein the instructions, when executed, cause the processor to perform actions comprising:
causing the display device to display the list of aircraft on a first display pane;
causing the display device to display, for each entry in the list of aircraft, a link to a respective second display pane; and
causing the display device to display, on each respective second display pane, further detail associated with the corresponding set of values, the further detail comprising one or more of a visual gauge indicator associated with the corresponding tire parameter, a location associated with the corresponding tire parameter, a tire parameter profile based on historical tire parameter readings for a given tire, and a message log comprising messages associated with status messages for the associated aircraft tires.

13. The aircraft tire monitoring system according to claim 1, wherein the instructions, when executed, cause the processor to perform actions comprising:
causing the display device to display, based on status messages for associated aircraft tires, an expandable message log comprising messages associated with status messages for the associated aircraft tires.

14. The aircraft tire monitoring system according to claim 1, wherein the remedial action comprises reinflation of one or more tires associated with the aircraft, and the priority of the reinflation is determined based on a time to reinflation.

15. The aircraft tire monitoring system according to claim 1, wherein the system comprises a memory configured to store the plurality of sets of values, and the instructions, when executed, cause the processor to perform operations comprising:

obtaining the plurality of sets of values from the memory to determine the remedial actions.

16. The aircraft tire monitoring system of claim 1, wherein the operations further comprise:
generating icons representing each of the aircraft in the plurality of aircraft, wherein each icon includes alphanumeric graphics identifying the aircraft, identifying each of the wheels of the aircraft and indicating the condition of the wheel;
arranging the icons to be shown in the display device in an order corresponding to the list ranking the aircraft, and
automatically rearranging the icons based on updates to the ranking of the aircraft.

17. A computer-implemented method comprising:
operating tire monitoring devices mounted to each wheel of a plurality of wheels on each aircraft in a plurality of aircraft, wherein the plurality of wheels on each of the aircraft includes at least one nose gear wheel and a plurality of main gear wheels such that the number of main gear wheels is greater than the number of the at least one nose gear wheel, and the operating of the tire monitoring device includes each of the tire monitoring devices collecting tire data indicating a condition of the tire on the wheel corresponding to the tire monitoring device and transmitting the tire data;
for each of the aircraft, arranging the tire data corresponding to the wheels of the aircraft into a set of values indicative of tire parameters of the tires on the wheels of the aircraft;
determining a remedial action associated with each of the sets of values;
determining a priority associated with the determined remedial actions;
generating, based on the determined remedial actions, a list of aircraft, the list of aircraft ranked based on the determined priority of remedial action; and
displaying the list of aircraft, on a display device, such that aircraft with a relatively higher priority remedial action are shown higher up the list on the display than aircraft with a relatively lower priority remedial action.

18. The computer-implemented method according to claim 17, wherein the method comprises displaying, on the display device and for each aircraft in the list, the corresponding set of values.

19. The computer-implemented method according to claim 17, wherein the tire parameters comprise tire pressures of associated aircraft tires, and the method comprises displaying, on the display device and for each aircraft in the list, an associated reference pressure for the corresponding aircraft tires.

20. The computer-implemented method according to claim 17, wherein the method comprises:
displaying, on the display device and for each aircraft in the list and associated aircraft tires, a status message based on the determined further remedial actions.

21. The computer-implemented method according to claim 20, wherein the method comprises:
determining, based on a status of tire monitoring devices associated with the plurality of aircraft tires, corresponding further remedial actions;
determining a further priority associated with each of the determined further remedial actions;
generating, based on the determined further remedial actions, the list of aircraft; and
displaying, on the display device, the list of aircraft, such that at least one of aircraft with a relatively higher priority remedial action are shown higher up the list on the display than aircraft with a relatively lower priority remedial action, and aircraft with a higher number of determined further remedial actions are shown higher up the list on the display than aircraft with a lower number of determined further remedial actions.

* * * * *